(12) United States Patent
Vidal-Vazquez et al.

(10) Patent No.: US 12,466,777 B2
(45) Date of Patent: Nov. 11, 2025

(54) DEVICE AND METHOD FOR PRODUCING METHANOL FROM CARBON DIOXIDE

(71) Applicant: KARLSRUHER INSTITUT FUER TECHNOLOGIE, Karlsruhe (DE)

(72) Inventors: Francisco Vidal-Vazquez, Ludwigshafen (DE); Roland Dittmeyer, Karlsruhe (DE); Peter Pfeifer, Linkenheim-Hochstetten (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 476 days.

(21) Appl. No.: 18/018,585

(22) PCT Filed: Jun. 25, 2021

(86) PCT No.: PCT/EP2021/025234
§ 371 (c)(1),
(2) Date: Jan. 30, 2023

(87) PCT Pub. No.: WO2022/028730
PCT Pub. Date: Feb. 10, 2022

(65) Prior Publication Data
US 2023/0303470 A1    Sep. 28, 2023

(30) Foreign Application Priority Data

Aug. 7, 2020  (DE) .................... 10 2020 120 879.0

(51) Int. Cl.
*C07C 29/152*  (2006.01)
*B01J 19/00*  (2006.01)
*B01J 19/24*  (2006.01)

(52) U.S. Cl.
CPC ......... *C07C 29/152* (2013.01); *B01J 19/0066* (2013.01); *B01J 19/2465* (2013.01); *B01J 2219/00103* (2013.01)

(58) Field of Classification Search
CPC . C07C 29/152; B01J 19/0066; B01J 19/2465; B01J 2219/00103; Y02C 20/40;
(Continued)

(56) References Cited

U.S. PATENT DOCUMENTS 6,686,398 B1    2/2004  Bähnisch
2009/0018220 A1  1/2009  Fitzpatrick
(Continued)

FOREIGN PATENT DOCUMENTS

CN           111302896 A  *  6/2020  ......... C07C 29/1518
DE    11 2006 001 310 T5      4/2008
(Continued)

OTHER PUBLICATIONS

Machine translation of DE-102017202313-A1 (Year: 2018).*
(Continued)

*Primary Examiner* — Deborah D Carr
(74) *Attorney, Agent, or Firm* — Norman B. Thot

(57) ABSTRACT

An apparatus for producing methanol from carbon dioxide. The apparatus includes a first circulation process for a circulating water and methanol which includes an absorption stage for carbon dioxide, a desorption stage with a hydrogen feed, a first heat exchanger, an outlet, a circulation pump, and an expansion throttle. The second circulation process for methanol, water, carbon dioxide and hydrogen includes the desorption stage, a first liquid-gas phase separation stage with a return conduit for liquid phases to the desorption stage, and a gas outlet from and an inlet into the desorption stage. The third circulation process for carbon dioxide and hydrogen includes a methanol synthesis reactor, a gas outlet of the first liquid-gas phase separation stage which opens out into the third circular conduit and an inlet into which the third circular conduit opens, a second heat exchanger, a gas outlet in the third circular conduit, and a fan.

17 Claims, 4 Drawing Sheets

(58) Field of Classification Search
CPC .... Y02P 20/151; Y02P 20/50; B01D 53/1425; B01D 53/1475
See application file for complete search history.

(56) References Cited

U.S. PATENT DOCUMENTS

| | | |
|---|---|---|
| 2012/0165418 A1 | 6/2012 | Park et al. |
| 2020/0055731 A1 | 2/2020 | Varanasi et al. |
| 2020/0291901 A1 | 9/2020 | Song |

FOREIGN PATENT DOCUMENTS

| | | | |
|---|---|---|---|
| DE | 11 2010 002 562 T5 | 9/2012 | |
| DE | 102017202313 A1 * | 8/2018 | ......... B01D 53/8671 |
| DE | 11 2017 005 411 T5 | 7/2019 | |
| DE | 11 2018 005 746 T5 | 7/2020 | |
| WO | WO 2001/17936 A2 | 3/2001 | |

OTHER PUBLICATIONS

Machine translation of CN-111302896-A (Year: 2020).*
E. C. D. Tan et al.: Comparative techno-economic analysis and process design for indirect liquefaction pathways to distillate-range fuels via biomass-derived oxygenated intermediates upgrading, Biofuels, Bioproducts & Biorefining, vol. 11, No. 1, pp. 41-66 (2017).

* cited by examiner

DEVICE AND METHOD FOR PRODUCING METHANOL FROM CARBON DIOXIDE

CROSS REFERENCE TO PRIOR APPLICATIONS

This application is a U.S. National Phase application under 35 U.S.C. § 371 of International Application No. PCT/EP2021/025234, filed on Jun. 25, 2021 and which claims benefit to German Patent Application No. 10 2020 120 879.0, filed on Aug. 7, 2020. The International Application was published in German on Feb. 10, 2022 as WO 2022/028730 A1 under PCT Article 21(2).

FIELD

The present invention relates to an apparatus and to a process for producing methanol from carbon dioxide.

BACKGROUND

One of the main causes of global climate change is the emission of greenhouse gases such as carbon dioxide, $CO_2$, from industrial processes, for example, combustion processes, or in the production of steel or cement, for example, into the Earth's atmosphere. One possible approach to reducing $CO_2$ emissions is the reduction of the use of fossil fuels in favor of an elevated use of renewable energies. However, renewable energies are often available in the form of electrical energy, and this alone, in particular in the case of energy-intensive processes, for example, the production of cement or steel, or in the context of long-distance mobility, does not thus constitute an alternative to chemical energy sources even in the long term.

Another approach to the reduction of emissions in the carbon dioxide balance is offered by what are called CCU (carbon capture and utilization) technologies. These remove $CO_2$ as it is formed from emissions, in particular from combustion offgases, or the atmosphere, and convert the $CO_2$ to carbonaceous fuels and chemicals using renewable energy in chemical processes.

On account of its relevance as a commodity chemical, production of methanol is one of the most important CCU applications. With global production exceeding 110 million tons per annum, methanol is required for the production of products, chemical intermediates, plastics and fine chemicals. Methods of converting methanol to hydrocarbonaceous fuels or else into the utilization of methanol itself as fuel are also known.

WO 2001/17936 A2 describes, for example, a process and a plant for the synthesis of methanol from a gas mixture of hydrogen, carbon monoxide and carbon dioxide. The gas mixture is converted to methanol under pressure in at least one synthesis stage, with heating of the gas mixture intended for use in a catalyst-filled methanol synthesis reactor in an additional trim heater directly before addition to the methanol synthesis reactor. The stated aim of preheating in this prior art lies in saving heat exchanger area and/or increasing the yield, taking particular account of the variable catalyst activity.

SUMMARY

An aspect of the present invention is to provide an apparatus for the production of methanol from carbon dioxide that maps an entire methanol synthesis process from the recovery of carbon dioxide from gas mixtures up to the generation of a methanol stream. An aspect of the present invention is also to provide a process for producing methanol from carbon dioxide using this overall methanol synthesis process.

In an embodiment, the present invention provides an apparatus for a production of methanol from carbon dioxide. The apparatus includes a first circulation process with a first circular conduit for a circulating first mixture of water and methanol, a second circulation process with a second circular conduit for a circulating second mixture of methanol, water, carbon dioxide and hydrogen, and a third circulation process with a third circular conduit for a circulating third mixture of carbon dioxide and hydrogen. The first circulation process comprises an absorption stage for carbon dioxide comprising a passage for a carbon dioxide-containing gas, a desorption stage for carbon dioxide comprising a feed for hydrogen, a first heat exchanger arranged between the absorption stage and the desorption stage, wherein the first circular conduit crosses in the first heat exchanger, an outlet for the circulating first mixture of water and methanol arranged between the desorption stage and the first heat exchanger, a circulation pump arranged between the absorption stage and the desorption stage, and an expansion throttle arranged between the first heat exchanger and the adsorption stage. The second circulation process comprises the desorption stage for carbon dioxide with the feed for hydrogen, a first liquid-gas phase separation stage comprising a return conduit for liquid phases of the methanol and the water to the desorption stage as a part of the second circular conduit, a gas outlet from the desorption stage, and an inlet into the desorption stage for the liquid phases of the methanol and the water. The third circulation process comprises a methanol synthesis reactor comprising a cooler, the first liquid-gas phase separation stage which further comprises a gas outlet which opens out into the third circular conduit and an inlet into which the third circular conduit opens, a second heat exchanger arranged between the methanol synthesis reactor and the first liquid-gas phase separation stage, wherein the third circular conduit crosses in the second heat exchanger, a gas outlet in the third circular conduit arranged between the methanol synthesis reactor and the second heat exchanger, and a fan arranged between the second heat exchanger and the inlet of the first liquid-gas phase separation stage.

BRIEF DESCRIPTION OF THE DRAWINGS

The present invention is described in greater detail below on the basis of embodiments and of the drawings in which.

DETAILED DESCRIPTION

Figure 1:
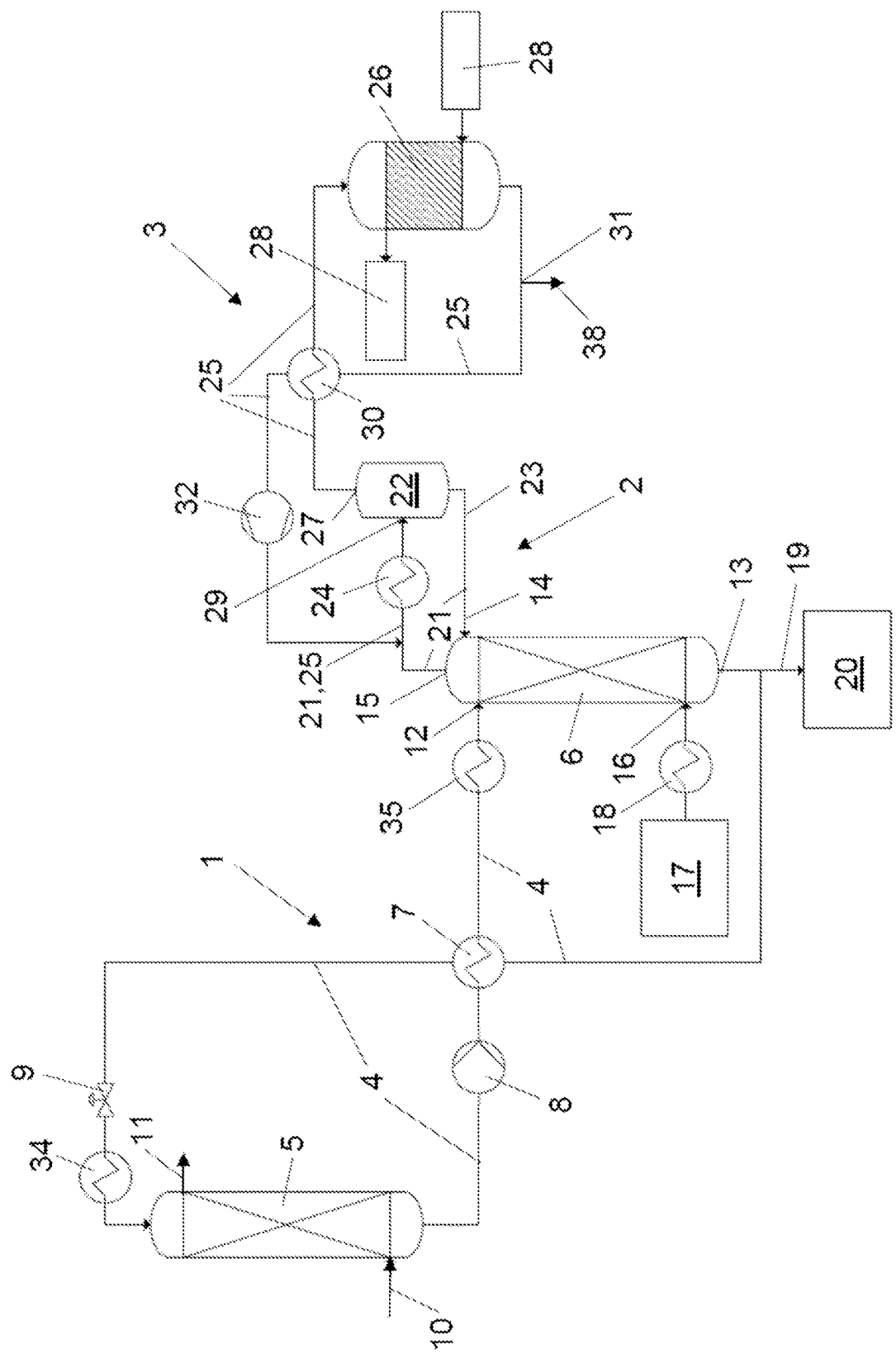
FIG. 1 shows a schematic of a first working example of an apparatus for production of methanol from carbon dioxide, comprising three circulation processes.

The present invention provides an apparatus and a process for producing methanol from a $CO_2$-containing gas mixture such as a combustion offgas or a process gas, and hydrogen.

A proposed apparatus for production of methanol from carbon dioxide comprises three circulation processes.

The first circulation process having a first circular conduit for a circulating first mixture of water and methanol comprises:
- i) an absorption stage for carbon dioxide having a passage for a carbon dioxide-containing gas,
- ii) a desorption stage for carbon dioxide having a feed for hydrogen,
- iii) a first heat exchanger between the absorption stage and the desorption stage, wherein the circulating conduit crosses in the heat exchanger,
- iv) an outlet for the first mixture of water and methanol between the desorption stage and the first heat exchanger,
- v) a circulation pump between the absorption stage and the desorption stage, and
- vi) an expansion throttle between the first heat exchanger and the adsorption stage.

The second circulation process having a second circular conduit for a circulating second mixture of methanol, water, carbon dioxide and hydrogen comprises:
- i) a desorption stage for carbon dioxide with the feed for hydrogen, and
- ii) a first liquid-gas phase separation stage having a return conduit for liquid phases of the methanol and the water to the desorption stage as part of the second circular conduit, and a gas outlet and an inlet for a liquid-gas phase mixture from the desorption stage.

The third circulation process having a third circular conduit for a circulating third mixture of carbon dioxide and hydrogen comprises:
- i) a methanol synthesis reactor having a cooler,
- ii) the first liquid-gas phase separation stage, wherein the gas outlet opens out into the third circular conduit and the third circular conduit opens into the inlet,
- iii) a second heat exchanger between the methanol synthesis reactor and the first liquid-gas phase separation stage, wherein the third circular conduit crosses in the second heat exchanger,
- iv) a gas outlet in the third circular conduit between the methanol synthesis reactor and the second heat exchanger, and
- v) a fan between the second heat exchanger and the inlet.

A proposed process for producing methanol from carbon dioxide comprises at least the following process steps:
- a) providing an apparatus for producing methanol from carbon dioxide, as described above, including optional configurations,
- b) passing a carbon dioxide-containing gas through the absorption stage, wherein the carbon dioxide is accepted into the first circulation process at a pressure between 1 and 10 bar (including the limits in each case) and a temperature between −30 and 10° C. (including the limits in each case) from a liquid first mixture of water and methanol,
- c) compressing and adjusting the temperature of the first mixture with the carbon dioxide in the circulation pump or in the first heat exchanger of the first circulation process to a pressure between 40 and 50 bar (including the limits in each case) and a temperature between 100 and 180° C. (including the limits in each case),
- d) introducing the compressed and temperature-adjusted first mixture with the carbon dioxide into the desorption stage, wherein the carbon dioxide is desorbed from the first mixture and withdrawn from the first circulation process and, with addition of hydrogen, is absorbed by a circulating second mixture of methanol, water, carbon dioxide and hydrogen in the second circulation process at a pressure between 40 and 50 bar (including the limits in each case) and a temperature between 100 and 180° C. (including the limits in each case),
- e) conducting the carbon dioxide onward in the second circulation process into the first liquid-gas phase separation stage in which a gas mixture of carbon dioxide and hydrogen is selectively diverted as a third mixture from the second into the third circulation process,
- f) heating up the gas mixture in the second heat exchanger in the third circulation process to a temperature between 210 and 260° C. (including the limits in each case),
- g) introducing the temperature-adjusted gas mixture into the methanol synthesis reactor and partially converting the third mixture to methanol and water,
- h) returning the third mixture, the methanol and the water through the second heat exchanger into the first liquid-gas phase separation stage,
- i) separating off the liquid constituents of the mixture, the methanol and the water in the first liquid-gas phase separation stage and recycling these via the second circulation process into the desorption stage, and
- j) continuously branching off a mixture of water and methanol from the desorption stage.

A fundamental concept of the present invention is to integrate the separation of carbon dioxide from an offgas or another carbon dioxide-containing gas into the circulation processes of the methanol synthesis process. A liquid absorbent already present within the downstream methanol synthesis is employed for the removal of carbon dioxide in the form of a mixture of methanol and water. It is also here proposed that the methanol that forms in the methanol synthesis be condensed together with water and be provided at least partially to the separation of the carbon dioxide from the offgas or other carbon dioxide-containing gases.

A further fundamental concept of the present invention is to desorb the carbon dioxide absorbed into the mixture of methanol and water out of the mixture again with hydrogen as purge gas, and then to feed it to the methanol synthesis together with the hydrogen.

It is also proposed, for example, that the methanol synthesis and the desorption of the carbon dioxide from the mixture of methanol and water be conducted at the same pressure level.

Integrated in an industrial process, for example, in a combustion process or a production process for cement or steel, a further advantage lies not just in the reduction of the $CO_2$ output of the industrial process, but also in the direct incorporation of a hydrogen electrolysis for the provision of the aforementioned purge gas in the overall process. This advantageously also reduces the apparatus and operating costs compared to conventional process for methanol synthesis in combination with a separation of $CO_2$.

The particular advantage of the present invention is that carbon dioxide is removed continuously from a flue gas stream or a process gas stream at low pressures irrespective of the particular carbon dioxide content (typically 10% to 90% by volume). These flue gas streams or process gas streams come from industrial and non-industrial processes, for example:
- biogas with carbon concentrations typically of 40-50% by volume,
- flue gas from an industrial process such as a power plant, a chemical process, steel production, cement production and the like, flue gas from a refuse incineration plant, and
carbon dioxide-containing synthesis gas from biomass gasification.

The present invention is elucidated in greater detail below by working examples, and the figures and descriptions that follow. All the features shown and combinations thereof are not only limited to these working examples and configurations thereof. These are much rather to be considered as being combinable representatively for further possible further configurations, but which are not represented as working examples.

Figure 2:
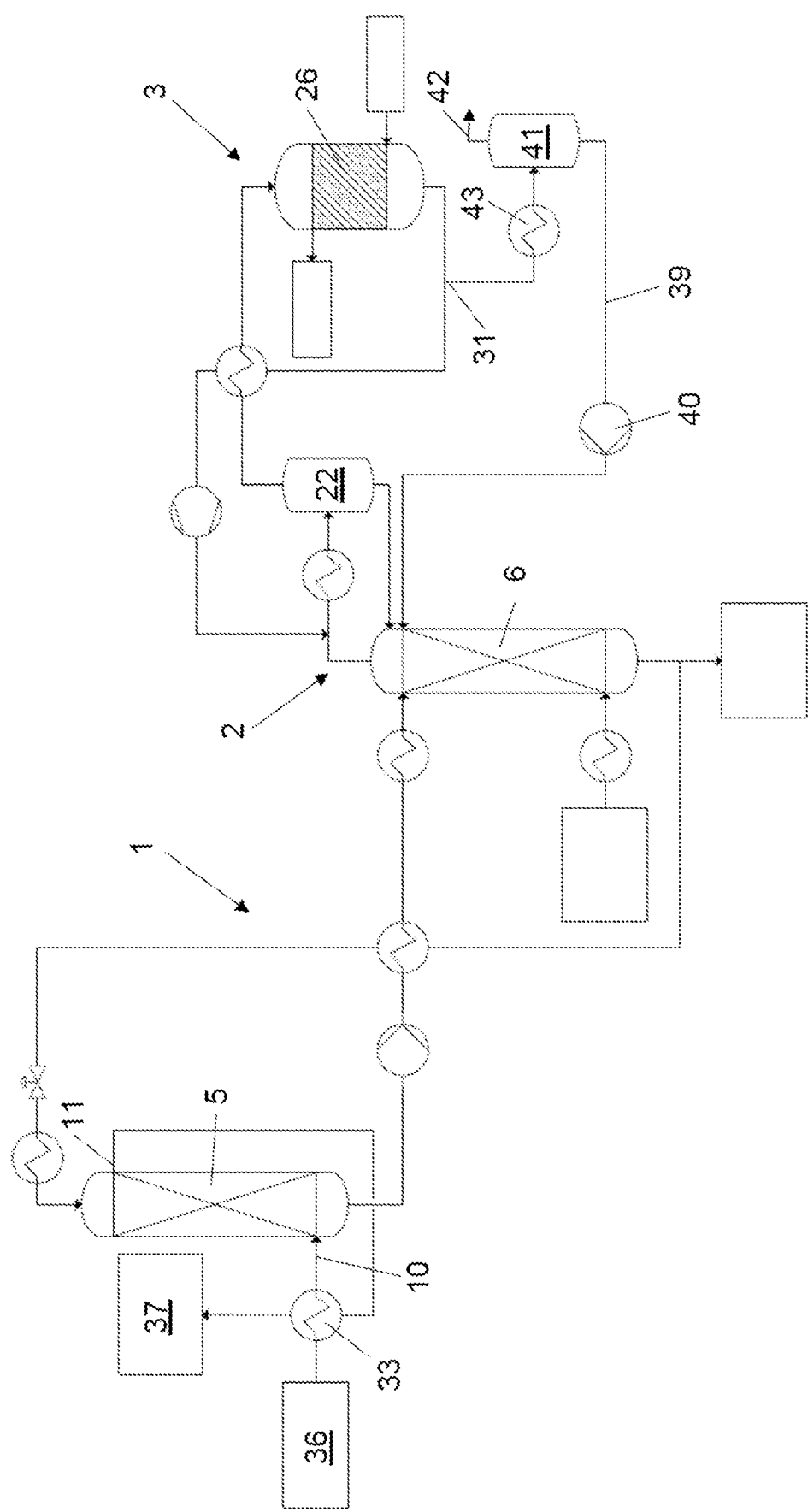
FIG. 2 shows a schematic of the first working example according to FIG. 1, but with an additional temperature control device for the combustion offgas or the process gas and an additional liquid phase return conduit to the desorption stage.
Figure 3:
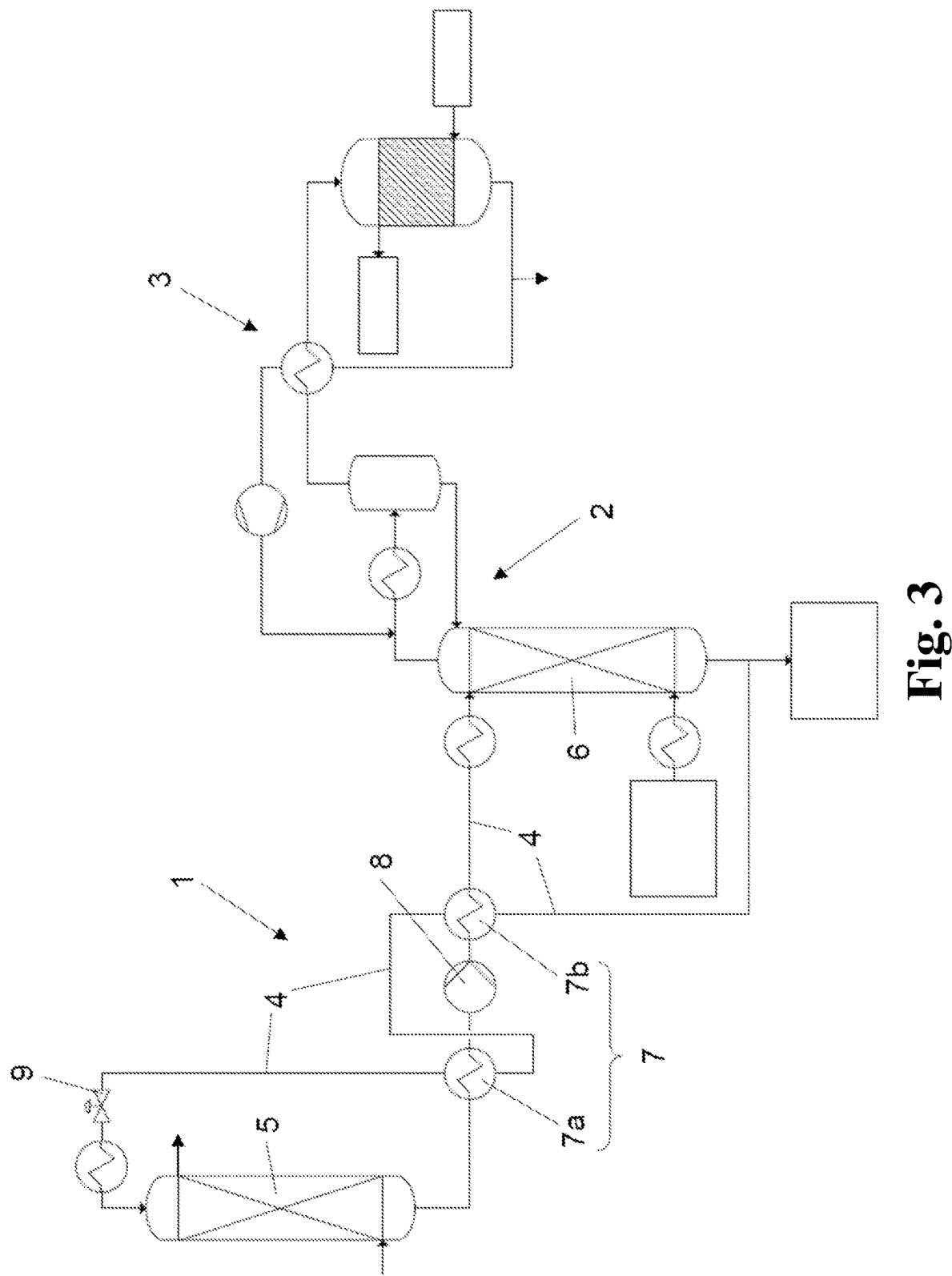
FIG. 3 shows a schematic of a second working example of an apparatus for production of methanol from carbon dioxide, comprising three circulation processes.

The apparatuses shown in FIGS. 1 to 3 for preparation of methanol from carbon dioxide comprise at least three circulation processes 1, 2 and 3. The embodiments shown are represented by way of example hereinafter with reference to FIG. 1, while optional configurations are also elucidated in detail with reference to FIGS. 2 and 3.

A first circulation process 1 has a first circular conduit 4 for a circulating first mixture of water and methanol. Provided therein are an absorption stage 5 and a desorption stage 6 for carbon dioxide, at least one first heat exchanger 7, a circulation pump 8, and an expansion throttle 9. The circular conduit crosses between the absorption stage and a desorption stage in the first heat exchanger 7.

The circular conduit 4 of the first circulation process 1 passes through the absorption stage 5, for example, from the top downward, followed by a series arrangement of circulation pump 8 and first heat exchanger 7, before it opens out into the desorption stage 6. Penetration through the desorption stage 6, as for the adsorption stage 5, is, for example, from the top downward, followed by a pass through the first heat exchanger 7 and an expansion throttle 9 back to the aforementioned absorption stage 5. The passages through the absorption stage 5 and the desorption stage 6 are part of the circular conduit of the first circulation process 1. This additionally crosses in the first heat exchanger 7, suitable for heat transfer between the crossing fluid streams of the first circulation process 1. The circulation pump 8 serves for compression, and the expansion throttle 9 for corresponding decompression, of the circulating first mixture of water and methanol, so that both the pressure and the temperature in the absorption stage 5 are above those in the desorption stage 6. In an advantageous manner, compression of gaseous carbon dioxide is avoided.

The absorption stage 5 has a passage and hence at least one inlet 10 and one outlet 11 for a carbon dioxide-containing gas, for example, an aforementioned combustion or process gas. The inlet 10 can, for example, be disposed at the bottom as shown, the outlet 11 at the top. It can, for example, be configured as a wet scrubber, meaning that it comprises an internal volume in which the carbon dioxide-containing gas can, for example, flow through from the bottom upward. The aforementioned first mixture of water and methanol, by contrast, is introduced into the internal volume at the top and penetrates through it in countercurrent to the flow downward and is then discharged again from the volume at the bottom via an outlet. The first mixture is liquid and serves firstly as solvent for selective absorption of carbon dioxide from the carbon dioxide-containing gas, and secondly as temperature-determining element for the process conditions in the absorption stage 5.

The desorption stage 6, by contrast, is incorporated not only into the first circulation process 1 but also into the second circulation process 2, which is described hereinafter. For this purpose, the desorption stage 6 can, for example, have one, for example only one, volume integrated equally as mixing chamber into the first and second circulation process 1, 2. The feed 12 of the first circulation process 1 can, for example, be at the top, the drain 13 at the bottom in the volume, so that flow as in a wet scrubber is here achievable. Inlet 14 for liquid constituents (and any residues of gases present, i.e., those that have not been separated off beforehand in the first liquid-gas phase separation stage described hereinafter) and gas outlet 15 for the gaseous constituents from the second circulation process can, for example, be at the top in the volume, while the liquid constituents of the second circulation process 2 are accommodated in the volume of the first circulation process 1 and are discharged with the latter at the bottom in the volume via the drain 13 from the first circulation process 1.

The volume also has a feed for hydrogen 16, for example, in the lower region of the volume for binding and hence desorption of the carbon dioxide bound in the first circulation process 1.

The hydrogen can, for example, be introduced directly from a high-pressure electrolysis (pressure is generated by pumping water, rather than compressing $H_2$ generated) as a hydrogen source 17, for which renewable power is utilizable. The hydrogen can alternatively be taken from an industrial process, provided that the hydrogen is in correspondingly high concentration (fore example, above 98% by volume). A hydrogen temperature control device 18 is also provided between the high-pressure electrolysis and the feed for hydrogen 16.

The first circulation process 1 is in the liquid phase on passage through the desorption stage 6, while the second circulation process 2 is introduced into the desorption stage 6 in liquid form, but is returned to the second process circuit therefrom via the drain 15 only with the gaseous constituent.

Additionally provided in the first circulation process 1 is an outlet 19 for the first mixture of water and methanol between the desorption stage 6 and the first heat exchanger 7. This can, for example, be the sole outlet for the methanol formed in the apparatus from the circulation processes. The proportion of the first mixture of water and methanol branched off thereby can, for example, be fed to a distillation apparatus 20 for the separation of methanol and water.

The second circulation process 2 with a second circular conduit 21 for a circulating second mixture of methanol, water, carbon dioxide and hydrogen passes through the aforementioned desorption stage 6 for carbon dioxide together with the feed for hydrogen 16, followed by a first liquid-gas phase separation stage 22 with a return conduit for liquid phases 23 of the methanol and the water to the desorption stage 6 as part of the second circular conduit and the aforementioned gas outlet 15 out of and an inlet 14 into the desorption stage 6.

The second circulation process 2 described also has a condenser 24 which can, for example, be arranged between gas outlet 14 and liquid-gas phase separation stage 22, in which the gaseous constituents of water and methanol are at least partly (further) liquefied, while the carbon dioxide and hydrogen remain in gaseous form and are passed over via a gas outlet 27 of the first liquid-gas phase separation stage 22 into the third circulation process 3 described hereinafter.

The first liquid-gas phase separation stage 22 and the condenser 24 are consequently incorporated not just into the second circulation process 2, but also into the third circulation process 3 described hereinafter.

The third circulation process 3 having a third circular conduit 25 for a circulating third mixture of carbon dioxide and hydrogen comprises a methanol synthesis reactor 26 with a cooler 28, the aforementioned first liquid-gas phase separation stage 22, wherein the gas outlet 27 opens out into the third circular conduit 25, and the third circular conduit, which opens into an outlet 29 into the liquid-gas phase separation stage 22. The third circular conduit can, for example, open (as shown in FIG. 1) into the second circular conduit 21 between gas outlet 15 and the optional condenser 27 of the inlet 29 into the second circular conduit 21. This means that the third circular conduit 25 leads via the second circular conduit 21 into the liquid-gas phase separation stage 22.

The third circulation process 3, between the methanol synthesis reactor 26 and the first liquid-gas phase separation stage 22, also passes through a second heat exchanger 30, wherein the third circular conduit 25 crosses in the second heat exchanger 30. In addition, between the methanol synthesis reactor 26 and the second heat exchanger 30, there is a fluid switch 31 as fluid outlet 38 in the third circular conduit 25. A fan 32 is additionally disposed in the gas-conducting section of the third circular conduit 25 between the second heat exchanger 30 and the inlet 29 into the first liquid-gas phase separation stage 22, for example, the condenser 24.

The aforementioned apparatus is advantageously operable at only two pressure levels, with only the absorption stage 5 in the first circulation process 1 fundamentally having to be operated with a flue gas or process gas pressure, and, for example, being designed for a range from 1 to 10 bar. All conduit regions of the three circulation processes in the circulation pump 8 and expansion throttle 9 that are disposed on either side in the first circular conduit 4 to the absorption stage 5 are designed for a significantly higher pressure matched to the demands of the process conditions of the methanol synthesis from $CO_2$. This can, for example, be uniformly within a range from 40 to 50 bar. The absorption stage 5 can, for example, be operated within a temperature range from $-40°$ C. to $30°$ C., for example, from $-30°$ C. to $10°$ C., the desorption stage 6, for example, within a temperature range from $-80°$ C. to $210°$ C., for example, from $100°$ C. to $180°$ C., for example, between $140°$ C. and $170°$ C., and the methanol synthesis reactor 26, for example, within a temperature range from $180°$ C. to $300°$ C., for example, from $210°$ C. to $260°$ C. The state parameters shown in schematic form in FIG. 4 in a process flow diagram of the process according to FIG. 1 are within these aforementioned intervals.

For temperature compliance and temperature monitoring of the temperature in the absorption stage 5 and the desorption stage 6, one temperature control device 34/35 in the first circular conduit 4 can, for example, be provided upstream of the desorption stage 6 and/or one upstream of the absorption stage 5. The temperature control devices in particular influence the inlet temperatures of the circulating first mixture of water and methanol into the absorption stage 5 and desorption stage 6 in the first circulation process 1 and hence the aforementioned temperatures in the absorption stage 5 and the desorption stage 6. The temperature control device 34 upstream of the absorption stage 5 can, for example, be a combined cooling and heating element or a cooling element. The temperature control device 35 upstream of the desorption stage 6 can, for example, be a combined cooling and heating element or a heating element.

FIG. 2 shows a schematic of the working example illustrated in FIG. 1, but supplemented by optional additional temperature control devices for the combustion offgas (or the process gas) and a likewise optional additional liquid phase return conduit to the desorption stage. The components that have not been given reference numerals, unless stated otherwise, correspond in principle to the components shown with reference numerals in FIG. 1.

The aforementioned temperature control devices in particular comprise a third heat exchanger 33. In this third heat exchanger 33, firstly the carbon dioxide-containing combustion gas from a process 36 upstream of the inlet 10 into the absorption stage 5 and secondly a combustion gas that has been discharged from the outlet 11 from the absorption stage 5 and can be fed to a downstream flue gas cleaning operation 37 can be passed through in one passage fraction each. The aim is to keep the temperature of the combustion gases at the process temperature in the absorption stage before entry into the absorption stage 5, i.e., in the aforementioned temperature range from $-40°$ C. to $30°$ C., for example, from $-30°$ C. to $10°$ C.

The additional liquid phase return conduit likewise shown in FIG. 2 follows on from the fluid outlet 38 that branches off at the fluid switch 31 from the third circulation process 3 from the third circular conduit 25 between the methanol synthesis reactor 26 and the second heat exchanger 30 (cf. FIG. 1). The fluid outlet opens into a liquid phase return conduit 39 to the desorption stage 6. The liquid phase return conduit can itself have, for example, a conveying pump 40 and/or a second liquid-gas phase separation stage 41 with a gas outlet 42 branching off therefrom for removal of inert gas constituents, so that, in principle, only the branched-off liquid constituents are returned to the desorption stage, for example, to the upper region of the desorption stage 6. Upstream of the second liquid-gas phase separation stage 41, a second condenser 43 can, for example, be provided in the liquid phase return conduit, which adjusts the fluid in the liquid phase return conduit to a temperature which can, for example, be within the temperature range present in the desorption stage 5 from $-80°$ C. to $210°$ C., for example, from $100°$ C. to $180°$ C., for example, between $140°$ C. and $170°$ C., and hence advantageously enables a more exact physical separation of the liquid water and methanol phases from the gaseous carbon dioxide and hydrogen phases.

FIGS. 1 and 2 represent configurations in which the circulation pump 8 is disposed between the adsorption stage 5 and the first heat exchanger 7.

FIG. 3 represents a further configuration of the apparatus which has the feature that the first heat exchanger 7 is formed by two (or more) series-connected heat exchange elements 7a and 7b, wherein the channels, i.e., the two sections of the first circular conduits, for two fluid fractions penetrate the two heat exchange elements 7a, 7b in the opposite sequence. The conduit sections between the two heat exchange elements optionally serve to accommodate the circulation pump 8 and/or the expansion throttle 9.

The expansion throttle 9 can, for example, be arranged between the absorption stage 5 and first heat exchanger 7 (as shown in all figures) since the lowering of the pressure and hence lowering of the temperature thus advantageously takes place after the heat transfer in the first heat exchanger 1.

FIG. 3 shows an arrangement of the circulation pump 8 between the adsorption stage 5 and desorption stage 6 between the two heat exchange elements 7a and 7b. This configuration has the advantage that a portion of the first conduit upstream of the circulation pump passes through at least the first heat exchange element 7a at a lower pressure and hence temperature level and hence an elevated temperature gradient and hence an elevated transfer of heat is here achievable. It is also possible, via the dimensions of the two heat exchange elements 7a and 7b, to adjust the temperature level of the intervening sections of the first circular conduit

4 exactly to a maximum possible operating temperature of the circulation pump 8 and/or the expansion throttle 9.

A configuration which is not shown in detail, but which is thermodynamically particularly favorable, envisages an arrangement of the circulation pump 8 between the first heat exchanger 7 and the desorption stage 6. The first circular conduit 4 penetrates the first heat exchanger 7 upstream of the expansion throttle 9 in the direction of the absorption stage 5, i.e., still with the elevated pressure, i.e., elevated temperature, of the desorption stage 6. By contrast, the first circular conduit 4, in the direction of the desorption stage 6, reaches the first heat exchanger 7 initially with the relatively low pressure and relatively low temperature of the absorption stage 5, before pressure and temperature are increased further in the downstream circulation pump 8. An elevated temperature gradient is achieved in the first heat exchanger 7 via this configuration. However, the maximum operating temperature of the circulation pump 8 limits usability, and therefore the configuration shown in FIG. 3 with an arrangement of the circulation pump, for example, between the two heat exchange elements 7a and 7b.

The first, second and third heat exchangers 7, 30, 33 and the heat exchange elements 7a, 7b mentioned are each surface heat exchangers, each with two fluid channels or fluid channel fractions, for example, countercurrent or crosscurrent heat exchangers. A different loading of the fluid fractions in the heat exchangers rules out use of mixed heat exchangers on account of the naturally envisaged physical mixing.

The configurations shown in FIGS. 2 and 3 are combinable with one another.

For the performance of the process for preparing methanol from carbon dioxide, an apparatus is first provided according to one of the aforementioned executions. Via the inlet 10, a carbon dioxide-containing gas is passed through the absorption stage 5 and discharged again through the outlet 11, for example, with absorption of the carbon dioxide by a liquid first mixture of water and methanol in the first circulation process 1 at one of the pressures and temperatures mentioned for the adsorption stage. This is followed by compression and adjustment of the temperature of the first mixture with the carbon dioxide in the circulation pump 8 or in the first heat exchanger 7 of the first circulation process 1 to a pressure or temperature which is, for example, specified for the desorption stage 5. The arrangement of the circulation pump 8 and the first heat exchanger 7 has been discussed above.

This is followed by introduction of the compressed and temperature-adjusted first mixture with the carbon dioxide into the desorption stage 6, wherein the carbon dioxide is desorbed from the first mixture and taken from the first circulation process 1 and, with addition of hydrogen, is taken up by a circulating second mixture of methanol, water, carbon dioxide and hydrogen in the second circulation process 2 within a range for pressure and temperature proposed for the desorption stage 6. The carbon dioxide $CO_2$ is here desorbed from the methanol/water mixture on account of the elevated temperature and a hydrogen stream injected via the feed 16 at the base of the desorption stage 6. The hydrogen stream here has two functions. It is firstly utilized as purge gas and hence increases $CO_2$ desorption in the, for example, column-shaped volume in the desorption stage. It secondly serves to introduce hydrogen as starting material for a methanol synthesis in the methanol synthesis reactor 26, in which the carbon dioxide and hydrogen are converted to methanol and water. For this purpose, carbon dioxide and the hydrogen are discharged via the gas outlet 15 from the desorption stage 6 into the second circulation process 2. The gases are then passed onward selectively into the third circulation process 3 via the first liquid-gas phase separation stage 22 as a gaseous third mixture via the gas outlet 27. This is followed, in the third circulation process 3, heated up after passage through the second heat exchanger 30, by a transfer to the methanol synthesis reactor 26. A for the most part complete conversion, but at least a partial conversion, of the third mixture to methanol and water occurs therein.

The gaseous third mixture of hydrogen and carbon dioxide (optionally still containing residual levels of methanol and water) is sprayed, for example, at the top into the internal volume of the methanol synthesis reactor 26, in the direction of the outlet of the methanol synthesis reactor 26 onto the water and methanol already formed, the result of which is commixing in boiling form and accelerated conversion to water and methanol.

Hydrogen ($H_2$) and carbon dioxide $CO_2$) react in the methanol synthesis reactor to form methanol and water. The reactor outlet temperature is controlled by a countercurrent flow of a kind of thermal fluid (e.g., boiling water or a different fluid). Control of the temperature at the reactor outlet is important for thermodynamic reasons, in order to maximize the yield of methanol.

The methanol and water leaving the methanol synthesis reactor 26 via an outlet disposed at the bottom in the internal volume, and also the unconverted portion of the third mixture, is then directed through the second heat exchanger 30 for temperature control, where it releases an excess of heat to the mass flow of the third mixture aiming to reach the methanol synthesis reactor 26 and returned to the first liquid-gas phase separation stage 22. There is constant removal therein of the liquid constituents of the mixture, the methanol and the water, and recycling thereof via the second circulation process 2 into the desorption stage 6, and a continuous branching-off of a mixture of water and methanol from the desorption stage 6. The remaining unconverted portion of the third mixture, by contrast, is separated out as gas in the first liquid-gas phase separation stage 22 and returned to the third circulation process 3 and therein to the methanol synthesis reactor 26.

A configuration of the process can, for example, additionally comprise passage of the aforementioned third mixture ($H_2$ and $CO_2$) and of the methanol and the water via a fluid switch 31 in the third circulation process 3 between the methanol synthesis reactor 26 and the second heat exchanger 30, wherein a portion of the third mixture, the methanol and the water is deflected into a fluid outlet 38. This partial removal of fluid constituents can, for example, serve for a constant removal even of unwanted gaseous reaction products and impurities from the third circulation process 3 and hence also from the methanol synthesis, which are otherwise returned constantly in the third circulation process 3 as gases in the first liquid-gas phase separation stage 22, and hence could not leave the process circuit and would lead to unwanted accumulation therein.

The portion of the third mixture, the methanol and the water separated off in the fluid switch, is recycled from the fluid outlet 38 via a liquid phase return conduit 39 to the desorption stage 6, i.e., to the effective region of the first two process circuits. The portion of the third mixture, the methanol and the water can, for example, however, be compressed in the liquid phase return conduit 39 with a conveying pump 40 and/or else be in particular freed of unwanted gas constituents in the second liquid-gas phase separation stage 41.

Figure 4:
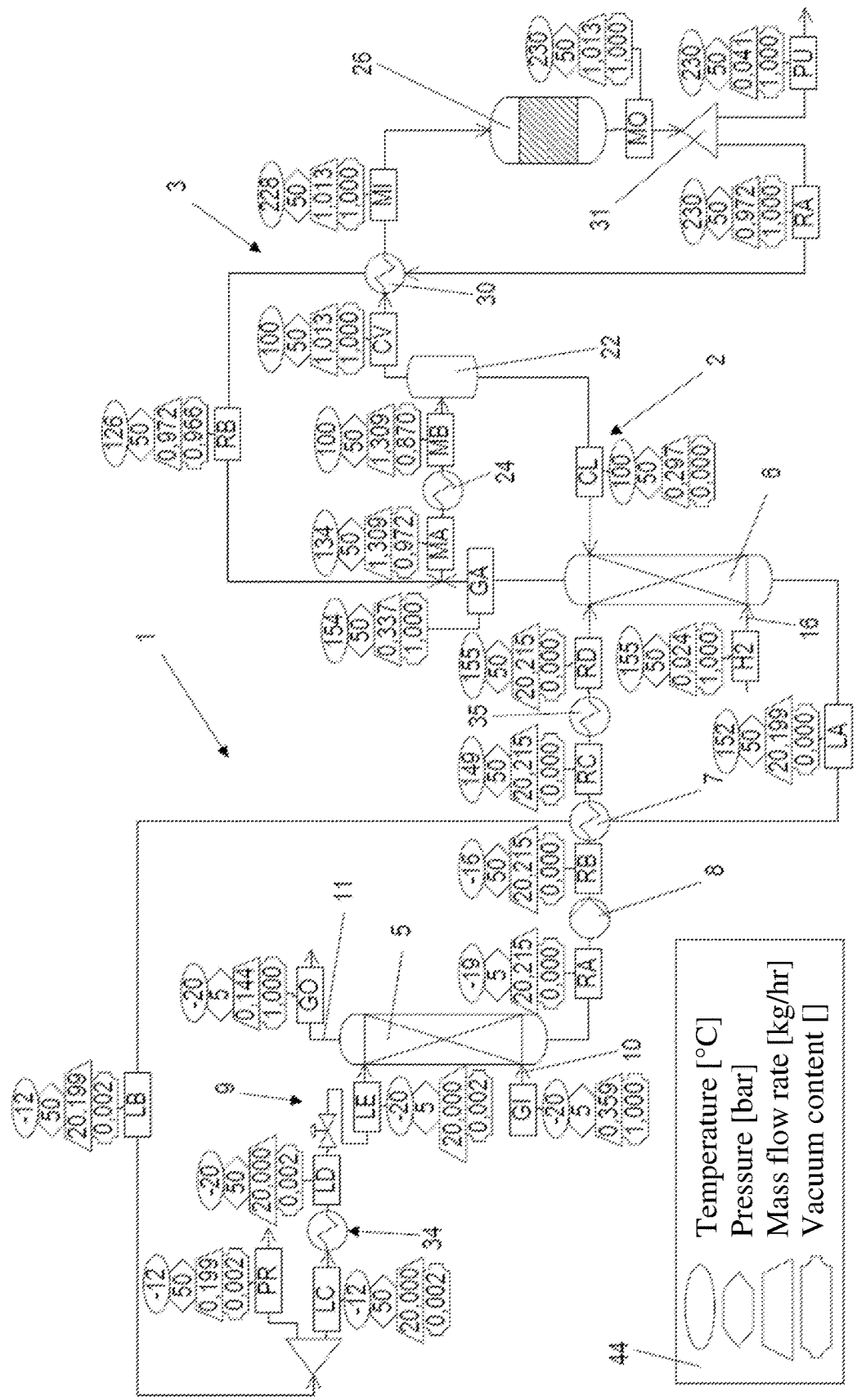
FIG. 4 shows a schematic of a flow diagram (process flow diagram) of the process in an apparatus as per the embodiment shown in FIG. 1.

FIG. 4 shows a schematic of a process flow diagram of the process in an apparatus as per the embodiment shown in FIG. 1. The legend 44 includes the shape symbols for multiple state data in the diagram: from the top downward for temperature in [° C.], the pressure in [bar], the mass flow rate in [kg/h] and the vacuum content in [—]. The shape symbols can be found in the diagram in all three circulation processes 1 to 3 at different points with the state data that exist there. Essential components of the apparatus are given the reference numerals already known from FIG. 1.

The present invention is not limited to embodiments described herein; reference should be had to the appended claims.

LIST OF REFERENCE NUMERALS 1 first circulation process
2 second circulation process
3 third circulation process
4 first circular conduit
5 absorption stage
6 desorption stage
7 first heat exchanger
7a-b heat exchange element
8 circulation pump
9 expansion throttle
10 inlet for a carbon dioxide-containing gas into the absorption stage
11 outlet for a carbon dioxide-containing gas from the absorption stage
12 feed of the first circulation process into the desorption stage
13 drain of the first circulation process from the desorption stage
14 inlet for liquid constituents of the second circulation process into the desorption stage
15 gas outlet from the desorption stage
16 feed for hydrogen into the desorption stage
17 hydrogen source
18 temperature control device for hydrogen
19 outlet for a mixture of water and methanol from the first circulation process
20 distillation apparatus
21 second circular conduit
22 first liquid-gas phase separation stage
23 return conduit for liquid phases to the desorption stage
24 condenser
25 third circular conduit
26 methanol synthesis reactor
27 gas outlet from the first liquid-gas phase separation stage
28 cooler
29 inlet into the liquid-gas phase separation stage
30 second heat exchanger
31 fluid switch
32 fan
33 third heat exchanger
34 temperature control device upstream of absorption stage
35 temperature control device upstream of desorption stage
36 process
37 flue gas cleaning
38 fluid outlet
39 liquid phase return conduit
40 conveying pump
41 second liquid-gas phase separation stage
42 gas outlet from the second liquid-gas phase separation stage
43 condenser in the liquid phase return conduit
44 legend of the process flow diagram

What is claimed is:

1. An apparatus for a production of methanol from carbon dioxide, the apparatus comprising:
a first circulation process with a first circular conduit for a circulating first mixture of water and methanol, the first circulation process comprising,
an absorption stage for carbon dioxide comprising a passage for a carbon dioxide-containing gas,
a desorption stage for carbon dioxide comprising a feed for hydrogen,
a first heat exchanger arranged between the absorption stage and the desorption stage, wherein the first circular conduit crosses in the first heat exchanger,
an outlet for the circulating first mixture of water and methanol arranged between the desorption stage and the first heat exchanger,
a circulation pump arranged between the absorption stage and the desorption stage, and
an expansion throttle arranged between the first heat exchanger and the adsorption stage;
a second circulation process with a second circular conduit for a circulating second mixture of methanol, water, carbon dioxide and hydrogen, the second circulation process comprising,
the desorption stage for carbon dioxide with the feed for hydrogen,
a first liquid-gas phase separation stage comprising a return conduit for liquid phases of the methanol and the water to the desorption stage as a part of the second circular conduit,
a gas outlet from the desorption stage, and
an inlet into the desorption stage for the liquid phases of the methanol and the water; and
a third circulation process with a third circular conduit for a circulating third mixture of carbon dioxide and hydrogen, the third circulation process comprising,
a methanol synthesis reactor comprising a cooler,
the first liquid-gas phase separation stage which further comprises a gas outlet which opens out into the third circular conduit and an inlet into which the third circular conduit opens,
a second heat exchanger arranged between the methanol synthesis reactor and the first liquid-gas phase separation stage, wherein the third circular conduit crosses in the second heat exchanger,
a gas outlet in the third circular conduit arranged between the methanol synthesis reactor and the second heat exchanger, and
a fan arranged between the second heat exchanger and the inlet of the first liquid-gas phase separation stage.

2. The apparatus as recited in claim 1, further comprising:
a condenser which is arranged in at least one of the second circular conduit and in the third circular conduit between at least one of the desorption stage and the second heat exchanger, and the first liquid-gas phase separation stage.

3. The apparatus as recited in claim 1, further comprising:
a fluid switch which is arranged in the third circular conduit between the methanol synthesis reactor and the second heat exchanger, and
the third circular conduit further comprises a fluid return conduit to the second heat exchanger and a fluid outlet.

4. The apparatus as recited in claim 3, wherein the fluid outlet opens out into a liquid phase return conduit to the desorption stage.

5. The apparatus as recited in claim 4, wherein the liquid phase return conduit comprises at least one of a conveying pump and a second liquid-gas phase separation stage which comprises a gas outlet for a removal of inert gas constituents.

6. The apparatus as recited in claim 1, wherein the absorption stage is a wet scrubber.

7. The apparatus as recited in claim 1, wherein the desorption stage comprises a volume which is integrated into both the first circulation process and into the second circulation process as a mixing chamber.

8. The apparatus as recited in claim 1, wherein,
the first heat exchanger is formed by a first heat exchange element and a second heat exchange element, and
each of the first heat exchange element and the second heat exchange element comprise channels which are arranged so that two fluid fractions pass therethrough in an opposite sequence.

9. The apparatus as recited in claim 8, wherein the circulation pump is arranged between the adsorption stage and the desorption stage between the first heat exchange element and the second heat exchange element.

10. The apparatus as claimed recited in claim 1, wherein the circulation pump is arranged between the adsorption stage and the first heat exchanger.

11. The apparatus as claimed recited in claim 1, wherein the circulation pump is arranged between the first heat exchanger and the desorption stage.

12. The apparatus as recited in claim 1, further comprising at least one of:
a temperature control device arranged upstream of the desorption stage in the first circular conduit, and
a temperature control device arranged upstream of the absorption stage in the first circular conduit.

13. A process for producing methanol from carbon dioxide, the process comprising:
providing the apparatus as recited in claim 1,
passing a carbon dioxide-containing gas through the absorption stage, wherein the carbon dioxide is absorbed into the first circulation process at a pressure of between 1 and 10 bar and a temperature of between −30 and 10° C. by the circulating first mixture of water and methanol;
compressing and adjusting the temperature of the circulating first mixture of water and methanol with the carbon dioxide absorbed therein in the circulation pump or in the first heat exchanger of the first circulation process to a pressure of between 40 and 50 bar and a temperature of between 10° and 180° C.;
introducing the compressed and temperature-adjusted circulating first mixture of water and methanol with the carbon dioxide absorbed therein into the desorption stage, wherein, the carbon dioxide is desorbed and withdrawn from the first circulation process and, with an addition of hydrogen, is absorbed by the circulating second mixture of methanol, water, carbon dioxide and hydrogen in the second circulation process at a pressure of between 40 and 50 bar and a temperature of between 10° and 180° C.;
conducting the carbon dioxide onward in the second circulation process into the first liquid-gas phase separation stage in which a gas mixture of carbon dioxide and hydrogen is selectively diverted as a third mixture from the second circulation process into the third circulation process;
heating up the third mixture in the second heat exchanger in the third circulation process to a temperature of between 21° and 260° C.;
introducing the heated-up third mixture into the methanol synthesis reactor so as to partially convert the third mixture to methanol and water;
returning the third mixture, the methanol and the water through the second heat exchanger into the first liquid-gas phase separation stage;
separating off liquid constituents of the third mixture, the methanol and the water in the first liquid-gas phase separation stage, and recycling thereof via the second circulation process into the desorption stage; and
continuously branching off a mixture of water and methanol from the desorption stage.

14. The process as recited in claim 13, wherein,
the apparatus further comprises:
a fluid switch which is arranged in the third circular conduit between the methanol synthesis reactor and the second heat exchanger; and
a fluid outlet arranged in third circular conduit, and
the process further comprises:
passing the third mixture, the methanol and the water through the fluid switch in the third circulation process between the methanol synthesis reactor and the second heat exchanger, wherein a portion of the third mixture, the methanol and the water is deflected into the fluid outlet.

15. The process as recited in claim 14, wherein,
the fluid outlet of the apparatus opens out into a liquid phase return conduit to the desorption stage, and
a portion of the third mixture, the methanol and the water from the fluid outlet is returned via the liquid phase return conduit to the desorption stage.

16. The process as recited in claim 15, wherein,
the liquid phase return conduit comprises at least one of a conveying pump and a second liquid-gas phase separation stage, and
the portion of the third mixture, the methanol and the water is at least one of compressed with the conveying pump in the liquid phase return conduit and is freed of gas components in the second liquid-gas phase separation stage.

17. The process as recited in claim 13, wherein at least one of,
a temperature control or adjustment device is arranged upstream of the desorption stage in the first circulation process, and
a temperature control or adjustment device is arranged upstream of the absorption stage in the first circulation process.

* * * * *